United States Patent
Givoly

(10) Patent No.: US 6,950,845 B2
(45) Date of Patent: Sep. 27, 2005

(54) DATA COLLECTION SYSTEM AND METHOD FOR REDUCING LATENCY

(75) Inventor: Tal Givoly, Cupertino, CA (US)

(73) Assignee: Amdocs (Israel) Ltd., Ra'anana (IL)

( * ) Notice: Subject to any disclaimer, the term of this patent is extended or adjusted under 35 U.S.C. 154(b) by 767 days.

(21) Appl. No.: 10/040,298

(22) Filed: Oct. 23, 2001

(65) Prior Publication Data

US 2002/0087743 A1 Jul. 4, 2002

Related U.S. Application Data

(60) Provisional application No. 60/242,732, filed on Oct. 23, 2000.

(51) Int. Cl.[7] .............................................. G06F 15/16
(52) U.S. Cl. ....................... 709/200; 709/206; 709/224; 379/201.03
(58) Field of Search ................................ 709/200, 224, 709/206; 379/201.03

(56) References Cited

U.S. PATENT DOCUMENTS

| | | | |
|---|---|---|---|
| 4,872,158 A | 10/1989 | Richards | .................... 370/58.1 |
| 4,872,159 A | 10/1989 | Hemmady et al. | ............ 370/60 |
| 5,838,909 A | 11/1998 | Roy et al. | ............... 395/200.39 |
| 5,905,874 A | 5/1999 | Johnson | .................... 395/200.8 |
| 6,006,254 A | 12/1999 | Waters et al. | ............... 709/205 |
| 6,023,268 A | 2/2000 | Brit, Jr. et al. | ............. 345/327 |
| 6,052,797 A | 4/2000 | Ofek et al. | .................... 714/6 |
| 6,405,251 B1 * | 6/2002 | Bullard et al. | ............... 709/224 |
| 6,438,575 B1 * | 8/2002 | Khan et al. | .................. 709/200 |
| 6,687,355 B1 * | 2/2004 | Porter | .................... 379/201.03 |
| 6,708,203 B1 * | 3/2004 | Makar et al. | ................ 709/206 |

FOREIGN PATENT DOCUMENTS

WO          00/67131          11/2000          ........... G06F/13/00

* cited by examiner

Primary Examiner—Jack B. Harvey
Assistant Examiner—Hai V. Nguyen
(74) Attorney, Agent, or Firm—Zilka-Kotab, PC

(57) ABSTRACT

A system, method and computer program product are provided for reducing latency while handling network accounting records using an aggregator. Initially, records are received which are indicative of network events. Such records are received in an aggregator for the purpose of aggregating the records. Thereafter, a command is generated in response to the receipt of the records before work is done by the aggregator. Accordingly, services may be rendered in response to the command with minimal latency caused by the aggregator.

30 Claims, 10 Drawing Sheets

US 6,950,845 B2

DATA COLLECTION SYSTEM AND METHOD FOR REDUCING LATENCY

RELATED APPLICATION(S)

The present application claims priority from a provisional application filed Oct. 23, 2000 under Ser. No. 60/242,732, which is incorporated herein by reference in its entirety.

FIELD OF THE INVENTION

The present invention relates to data collection, and more particularly to reducing latency during the data collection process.

BACKGROUND OF THE INVENTION

Network accounting involves the collection of various types of records while sending and receiving information over a network. Examples of such records may include, but are not limited to a session's source, destination, user name, duration, time, date, type of server, volume of data transferred, etc. Armed with such accounting records, various services may be provided that require network usage metering of some sort.

Prior art FIG. 1 illustrates an exemplary system 100 for performing network accounting in accordance with the prior art. As shown, a plurality of information sources 102 is provided for collecting information. It should be noted that the information sources 102 may include a firewall, router, workstation, or any other network device that is subjected to a flow of information.

Coupled to the information sources 102 is an aggregator 104. In use, the aggregator 104 receives records from the information sources 102 for the purpose of aggregating the same. In the present description, aggregation refers to consolidation, analysis, or any other type of handling of the data. Once aggregated, the records may be used to afford any desired type of service, OSS (Operational Support System), and/or BSS (Business Support System), i.e. billing, fraud detection, network monitoring, traffic engineering, etc.

Prior art FIG. 2 illustrates a sample method 200 carried out by the aggregator 104 of the system 100 shown in FIG. 1. It should be noted that the present method 200 is illustrative in nature, and should not be construed as limiting on the term "aggregation." Of course, aggregation may be carried out in a variety of different ways using varying practices.

As shown, records are received from the information sources 102 in operation 202. It is then determined in decision 204 as to whether the record is the start of a new aggregation. This may be accomplished by identifying a particular aggregation field, regular attribute, and/or "key" in the received records. Such keys often determine an aggregation bin, and may be any type of policy of indication which signifies that a new aggregation has been started, or an update and/or termination operation is necessary. Thereafter, a new aggregation is started if it is determined in decision 204 that such is necessary. Note operation 206. If not, aggregation is continued on a normal basis, as indicated in operation 208.

One problem with such a method is that latency is incurred because data is held back before being exposed in real-time. In the context of the present description, a "real-time" environment is that which ensures no more than a fixed latency. Unfortunately, the service, OSS, and/or BSS can not be initiated until after the data is exposed.

Prior art FIG. 3 is a flowchart illustrating an evaluation procedure 300 that is executed in parallel periodically with the method of FIG. 2. Similar to before, the present method 300 is illustrative in nature, and should not be construed as limiting on the term "aggregation." Of course, aggregation may be carried out in a variety of different ways using varying practices.

Initially, an evaluation is carried out to determine whether an update or stop threshold is met. Note decision 302. It should be noted that an update or stop threshold may be any policy that triggers the aggregation to be updated or terminated, respectively. Again, a particular aggregation field, regular attribute, and/or "key" may be used to determine whether an update or stop threshold is met. If it is decided in decision 302 that an update or stop threshold is met, the aggregation may be updated or terminated appropriately in operation 304. Finally, a certain periodic time is allowed to elapse before re-initiating the evaluation procedure 300. Note decision 306.

Yet another problem arises as a result of the above evaluation procedure 300. Specifically, after an event occurs that renders the aggregation ready to be updated or stopped, latency is incurred while waiting for the periodic evaluation procedure 300 to initiate so that the appropriate action takes place. Again, this latency may be unacceptable in a real-time environment.

There is therefore a need for a technique of reducing latency in the aggregation process.

DISCLOSURE OF THE INVENTION

A system, method and computer program product are provided for reducing latency while handling network accounting records using an aggregator. Initially, records are received which are indicative of network events. Such records are received in an aggregator for the purpose of aggregating the records. Thereafter, a command is generated in immediate response to the receipt of the records before work is done by the aggregator. Accordingly, services may be rendered in response to the command with minimal latency caused by the aggregator.

In one embodiment of the present invention, the command may be a start command that is generated before the aggregator performs any operations such as generating a memory state, i.e. bucket, bin, etc., in response to the receipt of records. As an option, the records may be received over a network utilizing TCP/IP or IPX protocol. Further, the records may be received from information sources.

In another aspect of the present invention, it may be determined whether any of the records is a signal. Thereafter, the aggregation may be evaluated in immediate response to the receipt of the signal, as opposed to a periodic basis. By this design, latency is minimized. Such evaluation may involve determining whether an update or stop command is necessary. Since this evaluation is done in immediate response to the receipt of the signal instead of periodically, latency caused by the aggregator is minimized.

In one embodiment of the present aspect, the evaluation of the records may include determining whether a threshold is met. As an option, the threshold may be user-configured. Further, the aggregation may be updated by marking one of the records that was last sent if an update threshold is met. Further, the aggregation may be stopped by resetting a memory state, i.e. bucket, bin, etc., associated with the records if a stop threshold is met. Optionally, the aggregation may be evaluated periodically in addition to being updated in immediate response to the receipt of the signal in case an update or stop is needed when no signal is received.

BRIEF DESCRIPTION OF THE DRAWINGS

Prior art

Prior art

Prior art

DESCRIPTION OF THE PREFERRED EMBODIMENTS

Figure 1:
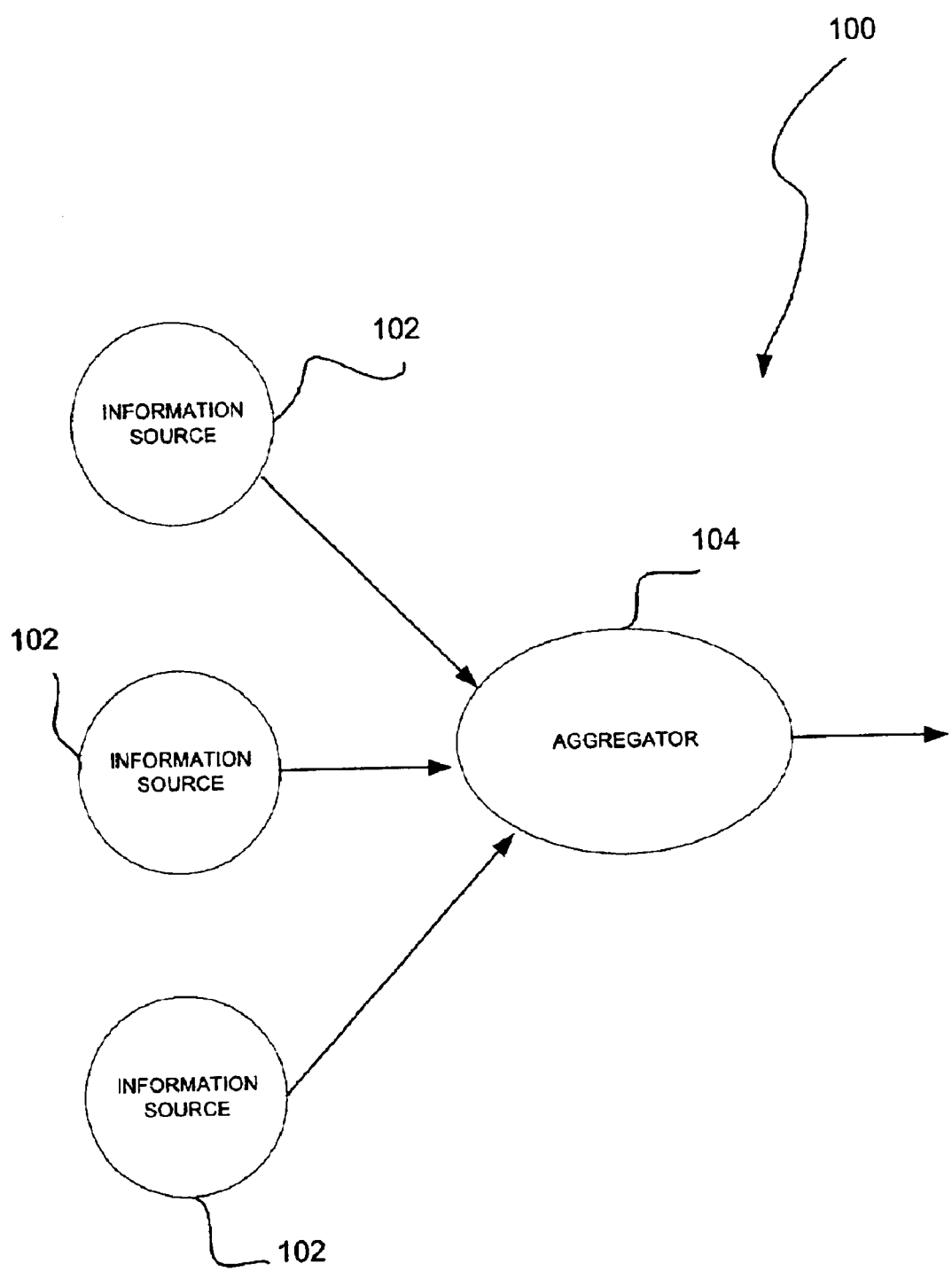
FIG. 1 illustrates an exemplary system for performing network accounting in accordance with the prior art.
Figures 2, 3:
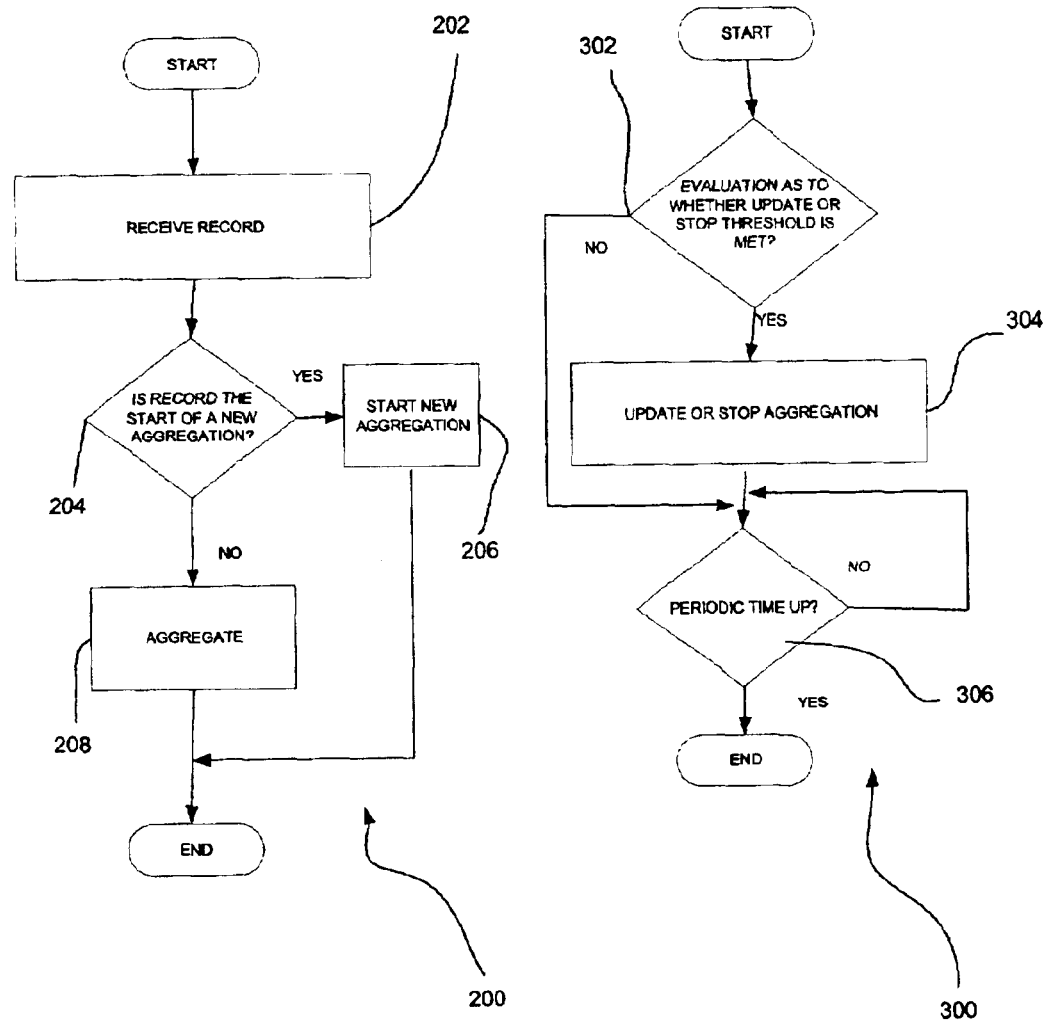
FIG. 2 illustrates a sample method associated with the aggregator of the system shown in FIG. 1.
FIG. 3 is a flowchart illustrating an evaluation procedure that is executed in parallel with the method of FIG. 2.
Figure 4:
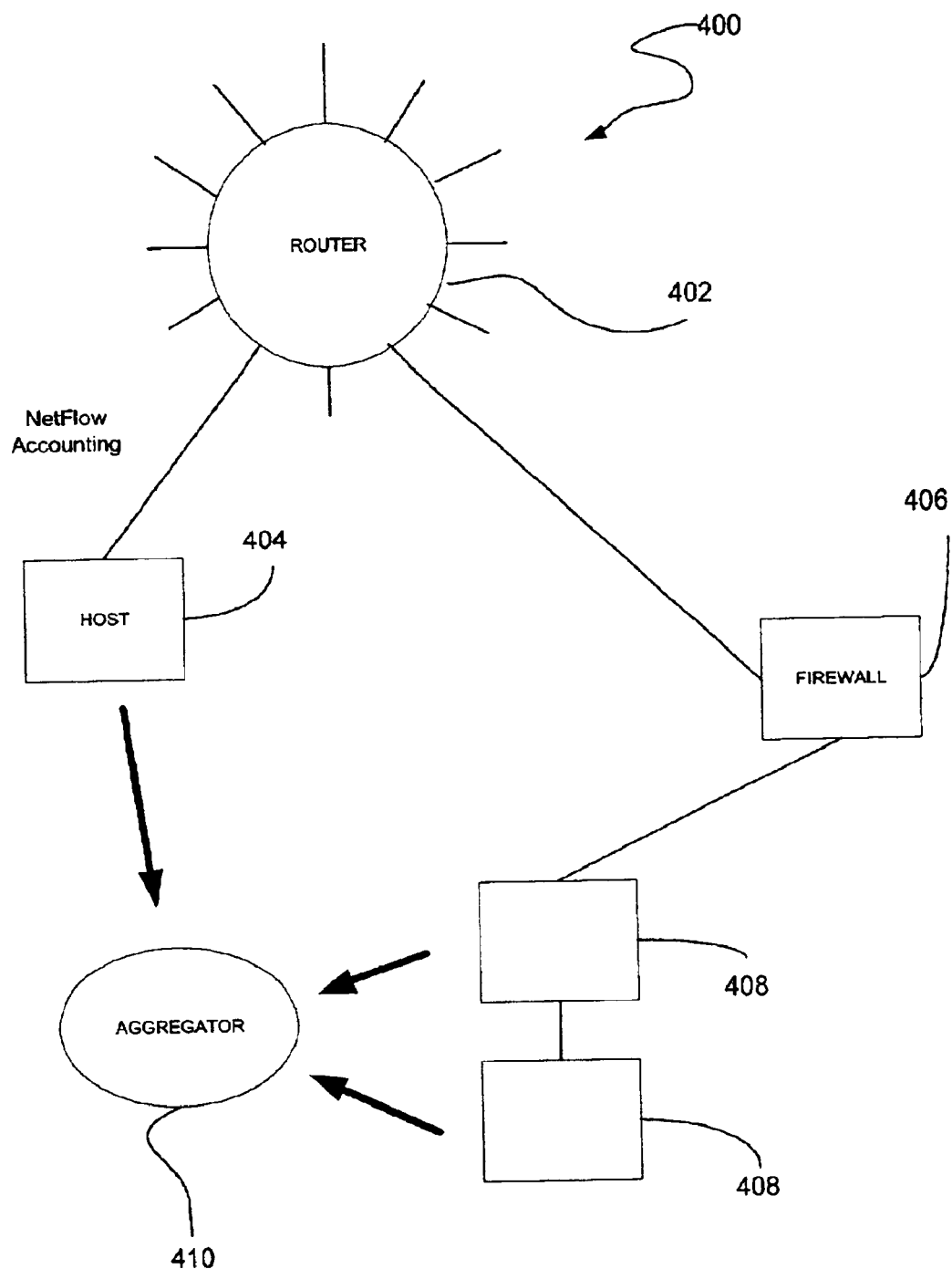
FIG. 4 illustrates an exemplary network framework on which one embodiment of the present invention may be implemented.

FIGS. 1–3 illustrate examples of the prior art. FIG. 4 illustrates an exemplary network framework 400 on which one embodiment of the present invention may be implemented. It should be noted that the network framework 400 of FIG. 4 need not necessarily be used, and any type of network framework may be utilized per the desires of the user. As shown in FIG. 4, various network components may be provided including a router 402 for routing information between various portions of the network. In one embodiment, such network may include the Internet using a communication protocol such as TCP/IP or IPX. It should be noted, however, that the network may include any type of network including, but not limited to a wide area network (WAN), Metropolitan Area Network (MAN), local area network (LAN), etc.

Further provided is a host 404 coupled to the router 402 for sending information thereto and receiving information therefrom. A firewall 406 may also be coupled to router 402 for controlling access to a network or a plurality of interconnected devices 408. While various network components have been disclosed, it should be understood that the present invention may be implemented in the context of any type of network architecture and in any type of network device such as proxy servers, mail servers, hubs, directory servers, application servers, AAA (Authentication, Authorization, Accounting) servers, etc.

Coupled to the various network devices is an aggregator 410. In use, the aggregator 410 receives records from the devices for the purpose of aggregating the same. In the present description, aggregation refers to consolidation, analysis, or any other type of handling of data. Once aggregated, the records may be used to afford any desired type of service, OSS (Operational Support System), and/or BSS (Business Support System), i.e. billing, fraud detection, network monitoring, traffic engineering, etc.

Figure 5:
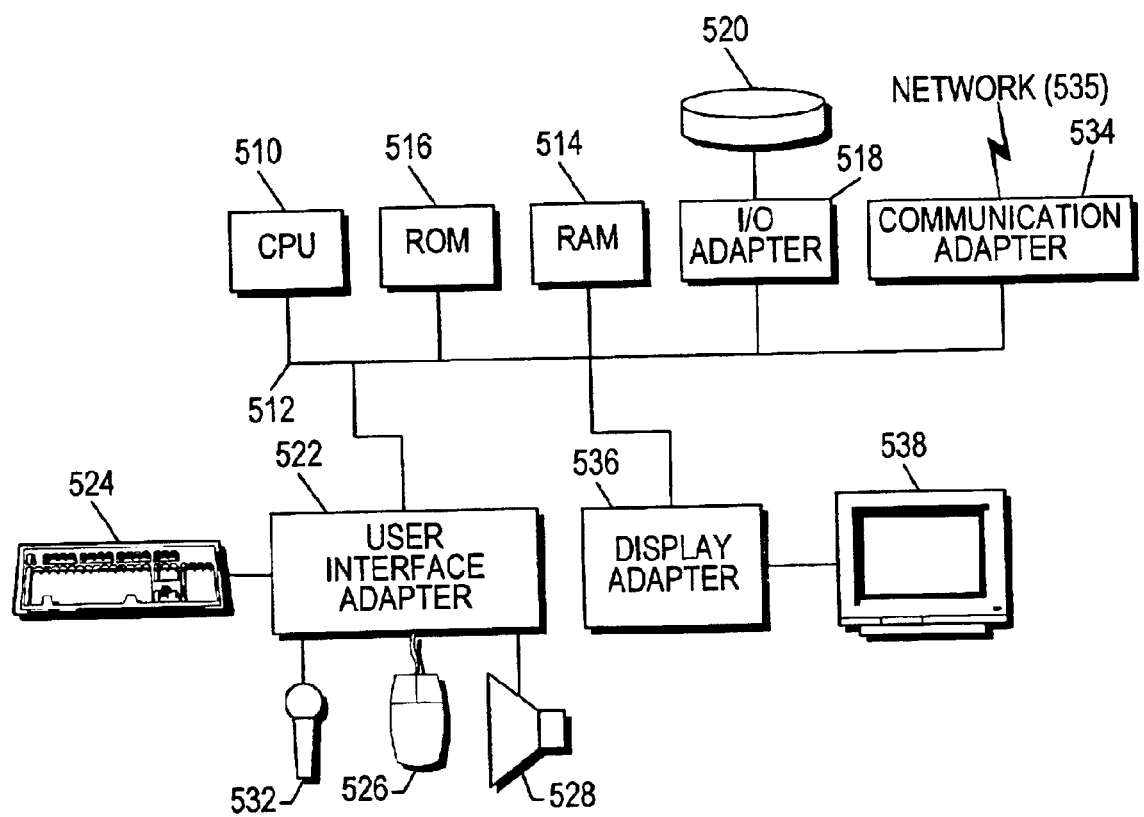
FIG. 5 shows a representative hardware environment associated with the various devices, i.e. host, etc., shown in the network diagram of FIG. 4.

FIG. 5 shows a representative hardware environment associated with the various devices, i.e. host, etc., shown in the network diagram of FIG. 4. Such figure illustrates a typical hardware configuration of a workstation in accordance with a preferred embodiment having one or multiple central processing units 510, such as a microprocessor, and a number of other units interconnected via a system bus 512. The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 512, communication adapter 534 for connecting the workstation to a communication network 535 (e.g., a data processing network) and a display adapter 536 for connecting the bus 512 to a display device 538.

The workstation may have resident thereon an operating system such as the Microsoft Windows NT or Windows Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

For further information on another exemplary architecture embodiment, reference may be made to PCT application WO9927556A2 entitled "NETWORK ACCOUNTING AND BILLING SYSTEM AND METHOD" published Jun. 3, 1999, which is incorporated herein by reference in its entirety. More information on such exemplary system will be set forth hereinafter starting with reference to FIG. 7.

It should be noted that the foregoing architectures should not be construed as limiting in any manner, and should be taken to merely represent exemplary systems for illustrative purposes only. For example, the present embodiment may be implemented in the context of any chip, host, router, network device, architecture, etc. that is desired.

Figure 6:
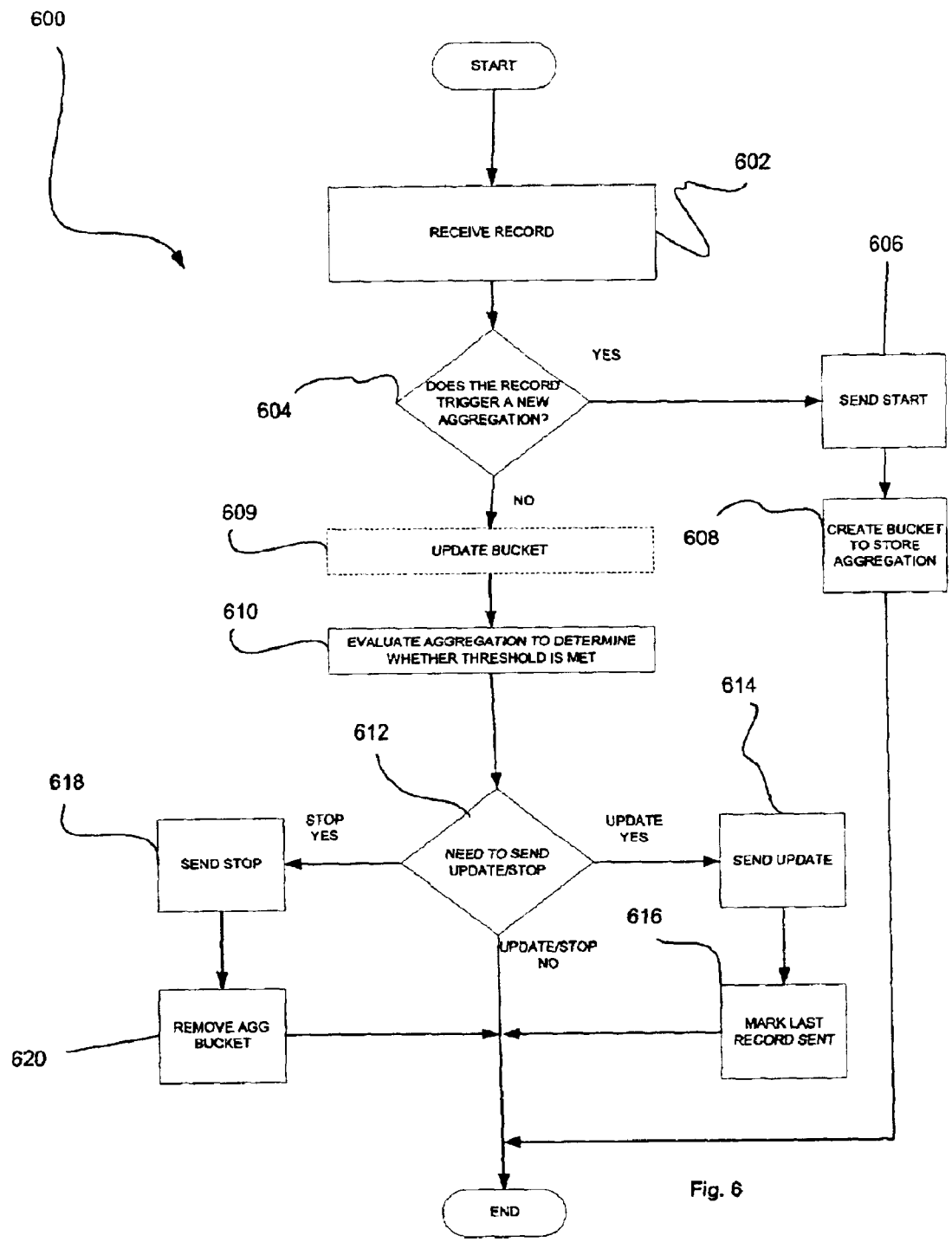
FIG. 6 shows a method for reducing latency while handling network accounting records using an aggregator in accordance with one embodiment of the present invention.

FIG. 6 shows a method 600 for reducing latency while handling network accounting records using an aggregator. Initially, in operation 602, records are received which are indicative of network events. Examples of network accounting information in the records may include, but are not limited to a session or flow's source, destination, user name, duration, time, date, type of server, volume of data transferred, etc.

Such records may be received from any type of information source or device including, but not limited to those set forth hereinabove in reference to FIGS. 4 and 5. As an option, the records may be received over a network such as the Internet utilizing UDP/IP, TCP/IP or IPX protocol. In one embodiment, the records are received by an aggregator for the purpose of aggregating the records. As set forth earlier, aggregation may refer to consolidation, analysis, or any other type of handling of data.

It is then determined in decision 604 as to whether the reception of a record triggers a new aggregation. This may be accomplished by identifying a signal in the received records. It should be noted that the signal may take any form including, but not limited to a particular aggregation field, regular attribute, and/or "key." As mentioned earlier, such keys may determine an aggregation bin and refer to any type of policy that determines whether a new aggregation should be started, or an update and/or termination is required. It should be noted, however, that the present invention is not limited to the use of keys as a signal.

If it is decided in decision 604 that a received record triggers the start of a new aggregation, a start command is generated in immediate response to the receipt of the records before other operations (i.e. memory state generation) are performed by the aggregator. In operation 606, such start command may immediately be sent to any receiving device or module in the data collection system. This would enable these devices and modules to invoke required services, processes or operations to handle the new aggregation. Accordingly, services can be rendered in response to the command with minimal latency caused by the aggregator. For example, such services may include providing a user with a balance in real-time, updating a prepaid debit account in real-time, detecting a denial-of-service attack or network intrusion in real-time, etc.

Thereafter, a memory state, i.e. bucket, bin, etc., is created in response to the receipt of records, as indicated in operation 608. Such a bucket or bin may refer to any type of volatile or non-volatile memory that indicates a state of the aggregation. In other words, a bucket refers to a single aggregation event stored in persistent and/or volatile memory for aggregation purposes. As an option, the bucket may include a plurality of fields for such aggregation purposes. It is important that the start command be generated before the aggregator generates a memory state in response to the receipt of records, so as to avoid latency problems.

If it is decided in decision 604 that a received record is not the start of a new aggregation, the aggregation is immediately evaluated in operation 610. As an option, the aggregation bucket may be updated in operation 609, preceding or following operation 610. This may be accomplished by updating the aggregation bucket to reflect the record received in operation 602.

During operation 610, a prompt evaluation is done to determine whether an update or stop threshold has been met. Note decision 612. It should be noted that an update or stop threshold may be any policy that triggers the aggregation to be updated or terminated, respectively. For example, the update threshold may depend on a predetermined time period that particular records have been in an aggregation. As an option, the threshold may be user-configured.

In the case where signals are used, it is important to note that the aggregation is evaluated in immediate response to the receipt of a signal, as opposed to a periodic basis in the prior art. Since this evaluation is done in immediate response to the receipt of the signal instead of periodically, latency caused by the aggregator is minimized.

If it is determined in decision 612 that an update threshold has been met, an update command is sent in operation 614. This is done immediately, prior to updating the aggregation and/or marking one of the records that was last sent. Note operation 616. Such marking may be optional based on the nature of the threshold(s). In some cases, the marking may be important in determining whether an update is necessary when operation 610 is executed in the future. It should be noted that the update command may include the content of the current update record. Further, it may be sent to any receiving device or module that may respond immediately with a service using such record. For example, such service may include providing a user with a balance in real-time, updating a pre-paid debit account in real-time, detecting a denial-of-service attack or network intrusion in real-time, etc.

If, on the other hand, it is determined in decision 612 that a stop threshold has been met, a stop command is sent immediately in operation 618. Thereafter, the aggregation is terminated by resetting a memory state, i.e. bucket, bin, etc., associated with the records. Optionally, the aggregation may be evaluated periodically in addition to being updated in immediate response to the receipt of the record(s) in case an update or termination is needed and no record is received.

It should be understood that the order of operations set forth hereinabove in the method 600 of FIG. 6 may be altered without deviating from the scope of the present invention. For instance, operations 609 and 610 may be interchanged along with any other operations set forth in FIG. 6.

Alternate Exemplary Embodiment

One embodiment of a system in which the foregoing details may be implemented will now be set forth. Of course, the following description should not be construed as limiting in any manner, and should be taken to represent merely an exemplary system for illustrative purposes.

The present embodiment includes a multi-source, multi-layer network usage metering and mediation solution that gives Network Service Providers (NSPs), including Internet Service Providers (ISPs) and enterprise network (Intranet) operators, the information needed to set the right-price for IP(Internet Protocol) services. With the system, the providers can generate accurate usage-based billing and implement usage-based charge-back models. The system derives IP session and transaction information, collected in real time, from a multitude of network elements. The system gathers, correlates, and transforms data from routers, switches, firewalls, authentication servers, LDAP, Web hosts, DNS, and other devices to create comprehensive usage and billing records.

The system transforms raw transaction data from network devices into useful billing records though policy-based filtering, aggregation, and merging. The result is a set of detail records (DRs). In some embodiments, the detail records are XaCCT Detail Records (XDRs™) available from XaCCT Technologies. DRs are somewhat similar in concept to the telephony industry's Call Detail Records (CDRs). Thus, DRs can be easily integrated with existing Customer Care and Billing (CCB) systems.

In addition to billing data, DRs enable NSPs to deploy new services based on documented usage trends, plan network resource provisioning, and audit service usage. The system provides a clear picture of user-level network service use by tracking a variety of metrics such as actual session Quality of Service (QoS), traffic routes, and end-user application transactions.

The system is based on a modular, distributed, highly scalable architecture capable of running on multiple platforms. Data collection and management is designed for efficiency to minimize impact on the network and system resources.

The system minimizes network impact by collecting and processing data close to its source. Modular architecture provides maximum configuration flexibility, and compatibility with multiple network information sources.

The system, or other embodiments, may have one or more of the following features.

Data collection can be from a wide range of network devices and services, spanning all layers of the network—from the physical layer to the application layer.

Real-time, policy-based filtering, aggregation, enhancement and merging create accurate, detailed and comprehensive session detail records(DRs).

Real time correlation of data from various sources allows billing record enhancement.

Leverages existing investment through integration with any customer care & billing solution, reducing costs, minimizing risks and shortened time-to-market.

Non-intrusive operation eliminates any disruption of network elements or services.

Web-based user interface allows off-the-shelf browsers to access the system, on-demand, locally or remotely.

Carrier-class scalability allows expansion to fit an NSPs needs without costly reconfiguration.

Distributed filtering and aggregation eliminates system capacity bottlenecks.

Efficient, centralized system administration allows on-the-fly system reconfigurations and field upgrades.

Customized reporting with built-in report generation or an NSPs choice of off-the-shelf graphical reporting packages.

Comprehensive network security features allow secure communication between system components and multiple levels of restricted access.

System Details

Figure 7:
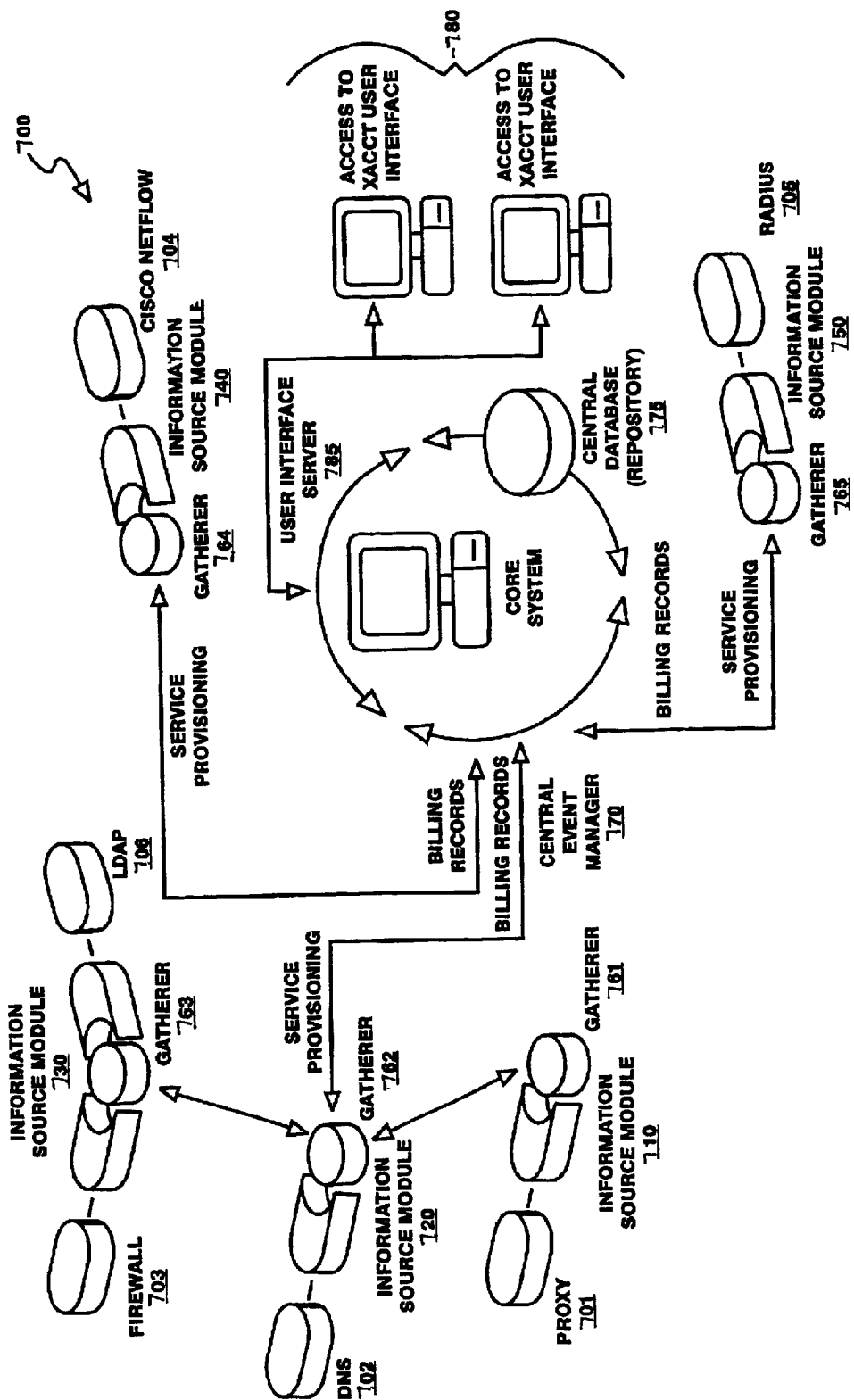
FIGS. 7–10B illustrate an alternate exemplary architecture with which the foregoing techniques may be implemented.

The following describes the system 700 of FIG. 7. The system 700 allows NSPs to account for and bill for IP network communications. The following paragraphs first list the elements of FIG. 7, then describes those elements and then describes how the elements work together. Importantly, the distributed data gathering, filtering and enhancements performed in the system 700 enables load distribution. Granular data can reside in the peripheries of the system 700, close to the information sources. This helps avoids reduce congestion in network bottlenecks but still allows the data to be accessible from a central location. In previous systems, all the network information flows to one location, making it very difficult to keep up with the massive record flows from the network devices and requiring huge databases.

The following lists the elements of FIG. 7. FIG. 7 includes a number of information source modules (ISMs) including an ISM 710, an ISM 720, an ISM 730, an ISM 736, an ISM 740, and an ISM 750. The system also includes a number of network devices, such as a proxy server 701, a DNS 702, a firewall 703, an LDAP 706, a CISCO NetFlow 704, and a RADIUS 705. The system also includes a number of gatherers, such as a gatherer 767, a gatherer 762, a gatherer 763, a gatherer 764, and a gatherer 765. The system of FIG. 7 also includes a central event manager (CEM) 770 and a central database (repository) 775. The system also includes a user interface server 785 and a number terminals or clients 780.

This paragraph describes how the elements of FIG. 7 are coupled. The various network devices represent devices coupled to an IP network such as the Internet. The network devices perform various functions, such as the proxy server 701 providing proxy service for a number of clients. Each network device is coupled to a corresponding ISM. For example, the proxy server 701 is coupled to the ISM 710. The DNS 702 is coupled to the ISM 720. The firewall 703 is coupled to the ISM 730. The ISM 736 is coupled to the LDAP 706. The ISM 740 is coupled to the CISCO NetFlow 704. The ISM 750 is coupled to the RADIUS 705. Each gatherer is associated with at least one ISM. Thus, the gatherer 761 is associated with the ISM 710 and is therefore coupled to that ISM. The gatherer 762 is coupled to the ISM 720. The gatherer 763 is coupled to the ISM 730 and the ISM 736. The gatherer 764 is coupled to the ISM 740. The gatherer 765 is coupled to the ISM 750. The various gatherers are coupled to the CEM 770. The user interface server is coupled to the terminals 780 and the CEM 770.

The following paragraphs describe each of the various elements of FIG. 7.

Network Devices

The network devices represent any devices that could be included in a network. (Throughout the description, a network device, unless specifically noted otherwise, also refers to an application server.) A network device represents a subset of information sources that can be used by the system 700. That is, the network devices are merely representative of the types of sources of information that could be accessed. Other devices such as on-line transaction processing databases can be accessed in other embodiments of the invention. Typically, the network devices keep logging and statistical information about their activity. A network information source can be the log file of a mail server, the logging facility of a firewall, a traffics statistics table available on a router and accessible through SNMP, a database entry accessible through the Internet, an authentication server's query interface, etc. The network devices represent the information sources accessed by the ISMs.

Each type of network device can be accessing using a different method or protocols. Some generate logs while others are accessible via SNMP, others have proprietary APIs or use other protocols.

ISMs

The ISMs act as an interface between the gatherers and the network devices enabling the gatherers to collect data from the network devices. Thus, the ISMs represent modular, abstract interfaces that are designed to be platform-neutral. The information source modules act as interfaces or "translators", sending IP usage data, in real time, from the network devices to the gatherers. Each ISM is designed for a specific type of network data source. (In other embodiments, some ISMs are generic in that they can extract information from multiple network devices). ISMs can be packaged separately, allowing NSPs to customize ISM configurations to meet the specific requirements of their network. For example, in the system of FIG. 7, if the NSP did not have Cisco NetFlow devices, then the ISM 740 would not have to be included.

The ISMs can communicate with its corresponding network device using protocols and formats such as UDP/IP, TCP/IP, SNMP, telnet, file access, ODBC, native API, and others.

In some embodiments, the reliability of system 700 is enhanced through on-the-fly dynamic reconfiguration, allowing the NSP to add or remove modules without disrupting ongoing operations. In these embodiments, the CEM 770 can automatically update the ISMs.

The following ISMs are available in some embodiments of the invention.

Categorizer—Classifies a session to a category according to user-defined Boolean expression.

DNS (e.g. ISM 720)—Resolves host names and IP addresses.

Generic Proxy Server (e.g., ISM 710)—Collects data from access logs in a common log format.

Port/Protocol Resolution—Converts protocol/port information to account names and vice versa.

CheckPoint FireWall-1—Collects data from FireWall-1 accounting log and security log.

Cisco IOS IP Accounting—Collects accounting data from a Cisco router using IOS IP accounting.

Cisco NetFlow Switching—Collects session data from a Cisco router via NetFlow switching.

NETRANET—Collects information from a standard network device.

Netscape Proxy Server—Collects data from a Netscape Proxy Server.

Microsoft Proxy Server—Collects data from a Microsoft ProxyServer.

ISMs can be synchronous, asynchronous or pipe. The data from an asynchronous ISM is dynamic so that the asynchronous ISM reacts to the information and relays it to the associated gatherer without prompting from other information sources in the system 700. If the firewall 703 were a CheckPoint FireWall-1, then the ISM 730 would be an example of an asynchronous ISM. When a network session is initiated, the details are recorded by the FireWall-1 703. The corresponding ISM 730 receives the details and passes them on automatically to the gatherer 763.

Synchronous ISMs provide its information only when accessed by a gatherer. The ISM 720 is an example of a synchronous ISM. The DNS server 702 maintains information matching the IP addresses of host computers to their domain addresses. The ISM 720 accesses the DNS server 702 only when the ISM 720 receives a request from the gather 762. When the DNS server 702 returns a reply, the ISM 720 relays the reply information to the gatherer 762.

Pipe ISMs operate on record flows (batches of records received from information sources). Pipe ISMs process one or more enhancement flows the records as the flows arrive. The pipe ISM may initiate new record flows or may do other things such as generate alerts or provision network elements to provide or stop services. The pipe is implemented as an ISM to keep the internal coherency and logic of the architecture. (Record flows can terminate in a database or in a pipe ISM. The pipe ISM can perform filtering and aggregation, send alarms, or act as a mediation system to provision network elements when some event occurs or some accumulated value is surpassed. Specifically, pipe ISMs can act to enable prepayment systems to disable certain services such as a voice IP call, when the time limit is surpassed or amount of data is reached.)

The gatherers can include caches and buffers for storing information from the ISMs. The buffers allow the gatherers to compensate for situations where there is a loss of connection with the rest of the system 700. The cache sizes can be remotely configured. The cache minimizes the number of accesses to the Information Source.

ISM queries can be cached and parallelized. Caching of synchronous ISM queries provides for fast responses. Parallelizing queries allows for multiple queries to be processed at the same time.

Gatherers

The gatherers gather the information from the ISMs. In some embodiments, the gatherers are multi-threaded, lightweight, smart agents that run on non-dedicated hosts, as a normal user application on Windows NT or Unix, as a background process, or daemon. What is important though is that the gatherers can be any hardware and/or software that perform the functions of a gatherer.

The gatherers can be installed on the same network segment as the network device such as router and switch or on the application server itself. This placement of a gatherer minimizes the data traffic impact on the network.

The gatherers collect network session data from one or more ISMs. Session data can be sent to another gatherer for enhancement or to the CEM 770 for merging and storing in the central database 770. The gatherers can be deployed on an as needed basis for optimal scalability and flexibility.

The gatherers perform flexible, policy-based data aggregation. Importantly, the various types of ISMs provide different data and in different formats. The gatherers normalize the data by extracting the fields needed by the CEM 770 and filling in any fields that may be missing. Thus, the gatherers act as a distributed filtering and aggregation system. The distributed data filtering and aggregation eliminates capacity bottlenecks improving the scalability and efficiency of the system 700 by reducing the volume of data sent on the network to the CEM 770.

Aggregation can be done by accumulating groups of data record flows, generating a single data record for each group. That single record then includes the aggregated information. This reduces the flow of the data records.

Filtering means discarding any record that belongs to a group of unneeded data records. Data records are unneeded if they are known to be collected elsewhere. A policy framework enables the NSP to configure what to collect where.

Filtering and/or aggregation can be done at any point along a data enhancement (described below) so that aggregation schemes can be based on enhanced data records as they are accumulated. The filtering and/or aggregation points are treated by the system 700 as pipe ISMs which are flow termination and flow starting points (i.e.: like an asynchronous ISM on the starting end and like a database on the terminating end). Data enhancement paths and filtering and/or aggregation schemes can be based on accumulated parameters such as user identification information and a user's contract type.

As noted above, the PISM can be used in the context of filtering and/or aggregation. One or more record flows can terminate at the PISM and can be converted into one or more new record flows. Record flows are grouped based on matching rules that apply to some of the fields in the record flows, while others are accumulated or undergo some other operation such as "maximum" "average". Once the groups of accumulated records have reached some threshold, new accumulated records are output. This can be used for example in order to achieve a business-hybrid filtering and aggregation data reduction by imposing the business rules or the usage-based products that are offered to the customer, onto the record flows as they are collected in real-time. This is done instead of previous system where the information is stored in a database and then database operations are performed in order to create bills or reports. The filtering and aggregation reduces the amount of data that is stored in the central database 775 while not jeopardizing the granularity of data that is necessary in order to create creative usage-based products.

Typically, data collected from a single source does not contain all the information needed for billing and accounting, such as user name and organization. In such cases, the data is enhanced. By combining IP session data from multiple sources, such as authentication servers, DHCP and Domain Name servers, the gatherers create meaningful session records tailored to the NSP's specific requirements. In the example of FIG. 7, the gatherer 761 can provide information to the gatherer 762 so that the source IP address for an Internet session from the proxy server 701 can be combined with the domain address from the DNS server 702.

The enhancement procedure can be triggered by an asynchronous ISM. The information from the asynchronous ISM is associated with field enhancements in the central database 775. A field enhancement defines how a field in the central database is filled from the source data obtained from the asynchronous ISM. Through the field enhancements, the missing parameters are added to a record using the data collected from one or more synchronous ISMs. Enhancements are described in detail below.

The gatherers can include caches and buffers for storing information from the ISMs. The buffers allow the gatherers to compensate for situations where there is a loss of connection with the rest of the system 700. The caches can reduce the number of accesses to an information source. The buffer and/or cache sizes can be remotely configured.

Central Event Manager (CEM)

The Central Event Manager (CEM) 770 acts as the central nervous system of the system 700, providing centralized, efficient management and controls of the gatherers and the ISMs. The CEM 770 can perform one or more of the following tasks.

- Coordinates, controls, and manages the data collection process. The CEM 770 coordinates the operation of the gatherers and manages the flow of data through the system 700 through the collection scheme defined in the system configuration. The latter includes the configuration of the gatherers, the ISMs, the network devices, the fields in the central database 775 (described below), and the enhancement procedures. Based on the collection scheme the CEM 770 determines the system 700's computation flow (the set of operations the system 700 must perform to obtain the desired information). The CEM 770 then controls all the gatherers, instructing them to perform, in a particular sequence, the operations defined in the computation flow. The CEM 770 receives the records collected by the gatherers and stores them in the central database775. NSPs can configure the CEM 770 to merge duplicate records before storing them in the central database 775. Record merging is described below.
- Performs clean-up and aging procedures in the database 775. The system 700 collects and stores large amounts of session information every day. The CEM 770 removes old data to free space for new data periodically. The NSP defines the expiration period for the removal of old records. The CEM 770 is responsible for coordinating the removal of records from the central database 775. The CEM 770 places a time stamp on every record when the record enters the central database 775 and deletes the record after the time period the NSP has defined elapses.
- Provides centralized system-wide upgrade, licensing, and data security. The NSP can perform version upgrades of the system 700 at the CEM 770. The gatherers can be automatically upgraded once a new version is installed on the host computer of the CEM 770. ISMs are also installed via the CEM 770 and exported to the gatherers. The CEM 770 maintains a list of licenses installed in the system and verifies periodically if the system is properly licensed. This feature lets the NSP centrally install and uninstall licenses. It also prevents unlicensed use of the system 700 and any of its components.
- Monitors the state of the gatherers and ISMs. The gatherers periodically communicate with the CEM 770. The CEM 770 continuously monitors the state of each gatherer and network devices in the system 700. The CEM 770 can be fault-tolerant, that is, it can recover from any system crash. It coordinates the recovery of the system 700 to its previous state.

In some embodiments, a key directory server is associated with the CEM770. To transfer less data between the elements of the system 700, it is desirable that each piece of data to carry little descriptive data. For example, if IP address data is transferred between a gatherer and the CEM 770, a description of the IP address data is typically included. In some embodiments, data name/key, type, and length descriptions are included with the actual IP address data. In other embodiments, there the key directory server reduces the amount of descriptive information being sent. Every key in the directory server has a type and a length. Fields can be identified as variable length. Therefore, data type information need not be transmitted between elements in the system 700 if the elements use a common reference key stored in the directory server. Returning to the IP address data, by using the key directory server, elements need only send two bytes for the key id and four bytes for the actual address. Most of the data being sent in the system is relatively short in length. Therefore, the directory server helps reduce the amount of information being sent between the elements in the system 700.

Keys can be added to the directory server. The directory server can therefore support expansion of the kinds of fields being sent by allowing system elements to update their locally stored key ids. For example, after a recipient receives a record with an "unknown" key, it contacts the directory server to get the key definition.

Central Database

The central database 775 is the optional central repository of the information collected by the system 700. The central database 775 is but one example of a sink for the data generated in the system 700. Other embodiments include other configurations. The central database 775 stores and maintains the data collected by the gatherers, as well as the information on the configuration of the system 700. Thus, in configuring the system 700, the NSP defines what data will be stored in each field in the central database 775 and how that data is collected from the ISMs.

The information on network sessions is stored in the database in the form of a table. Each field in the table represents a network session parameter. Each record describes a network session. The system 700 has a set of pre-defined fields that are configured by the CEM 770 on installation. The NSP can modify the central database 775 structure by adding, deleting, or modifying fields. The NSP access the data in the central database 775 by running queries and reports. The old data is removed from the central database 775 to free space for new data periodically. You can specify the time interval for which records are stored in the central database 775. The structure of the central database 775 with some of the predefined fields is illustrated in the following figure.

As each IP session may generate multiple transaction records, during the merge process the CEM 770 identifies and discards duplications, enhancing the efficiency of the data repository. Generally, data records are passed through the merger program, in the CEM 770, into the central database 775. However, the data records are also cached so that if matching records appear at some point, the already stored records can be replaced or enhanced with the new records. The database tables that contain the record flows can be indexed, enhancing the efficiency of the data repository. A merge is achieved by matching some of the fields in a data record and then merging the matching records from at least two record flows, transforming them into one record before updating the central database 775. In some embodiments, adaptive tolerance is used to match records. Adaptive tolerance allows for a variation in the values of fields that are compared (e.g., the time field value may be allowed to differ by some amount, but still be considered a match). The adaptive aspect of the matching can include learning the appropriate period to allow for the tolerance. The reason that the records that do not match any previous records are sent through into the central database 775, in addition to being cached for later matching, is to avoid loss of data in case of system failure.

The system 700 supports a non-proprietary database format enabling the central database 775 to run on any of a number of commercially available databases (e.g., MS-SQL Server, Oracle Server, D132, etc.).

User Interface Server and Clients

The User Interface Server (UIS) 785 allows multiple clients (e.g. terminals 780) to access the system 700 through, the Microsoft Internet Explorer with Java™ Plug-in or Netscape Navigator with Java™ Plug-in. Other embodiments can use other applications to access the system 700. The main function of the UIS 785 is to provide remote and local platform independent control for the system 700. The UIS 785 can provide these functions through windows that correspond to the various components of the system 700. Access to the system 700 can be password protected, allowing only authorized users to log in to the system and protecting sensitive information.

The NSP can perform one or more of the following main tasks through the UIS 785:

Configure the system 700.

Create and run queries and reports on network activity and resource consumption.

Register and license the system 700.

Data Distillation

Figure 8:
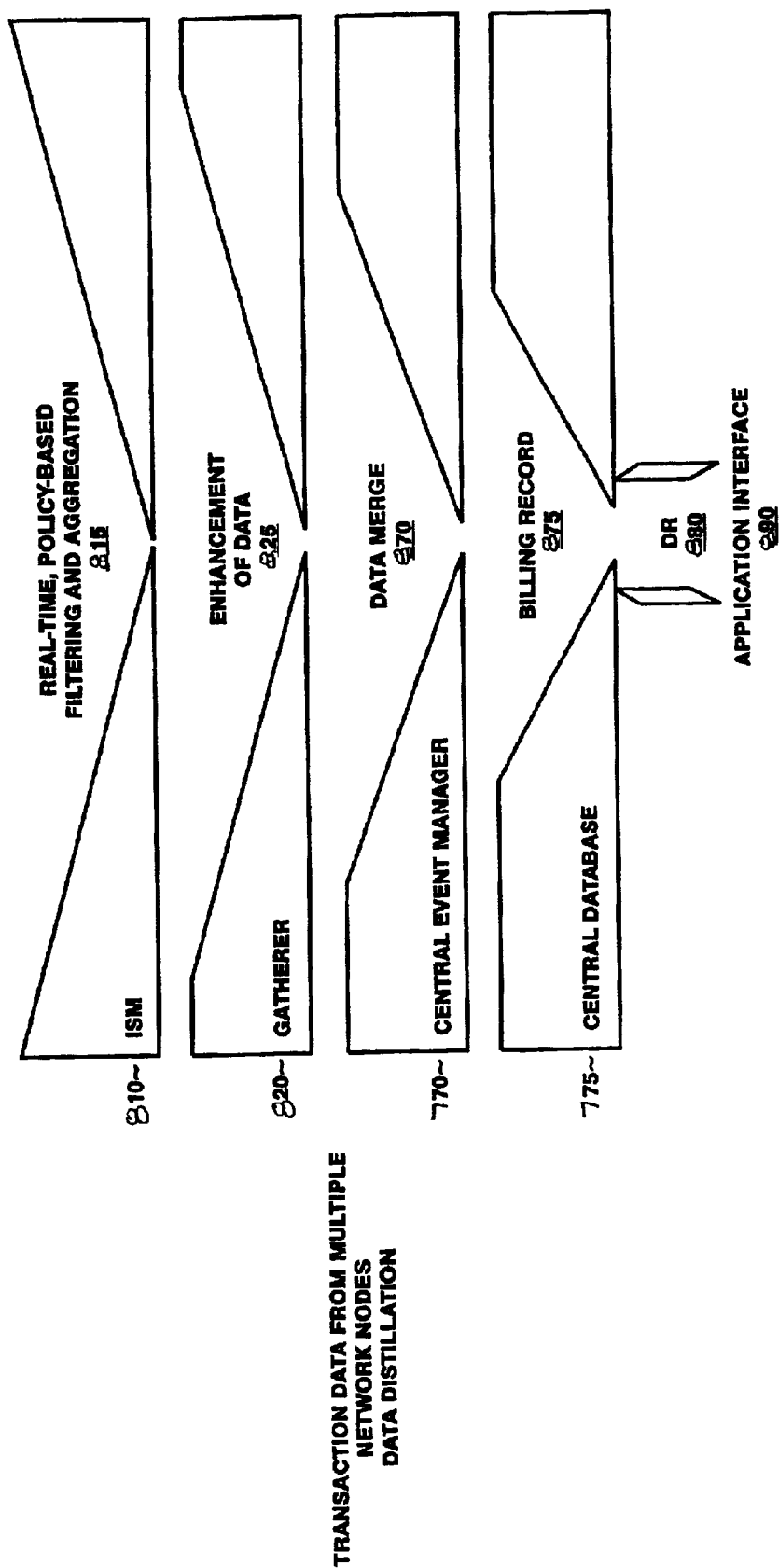

FIG. 8 illustrates the data distillation process performed by the system of FIG. 7. The data distillation aggregates and correlates information from many different network devices to compile data useful in billing and network accounting.

First, the ISMs 810 gather data from their corresponding network device. Note that for some ISMs (e.g. pipe ISMs), real-time, policy-based filtering and aggregation 815 can also be done. This data is then fed to the gatherers 820. The gatherers 820 perform data enhancement to complete the data from the ISMs 810. The results are provided to the CEM 770. The CEM 770 performs data merges 870 to remove redundant data. The merged data is then optionally stored in the central database 775 as a billing record 875 or is sent directly to an external system. The billing record information can be accessed from external applications, through the application interface 890, via a data record 880. Filtering and/aggregation and/or data enhancements can be done at any stage in the system 700.

Data Enhancement

As mentioned above, the gatherers 820 provide data enhancement features to complete information received from the ISMs 810. The following describes some example data enhancement techniques used in some embodiments of the invention.

Figure 9:
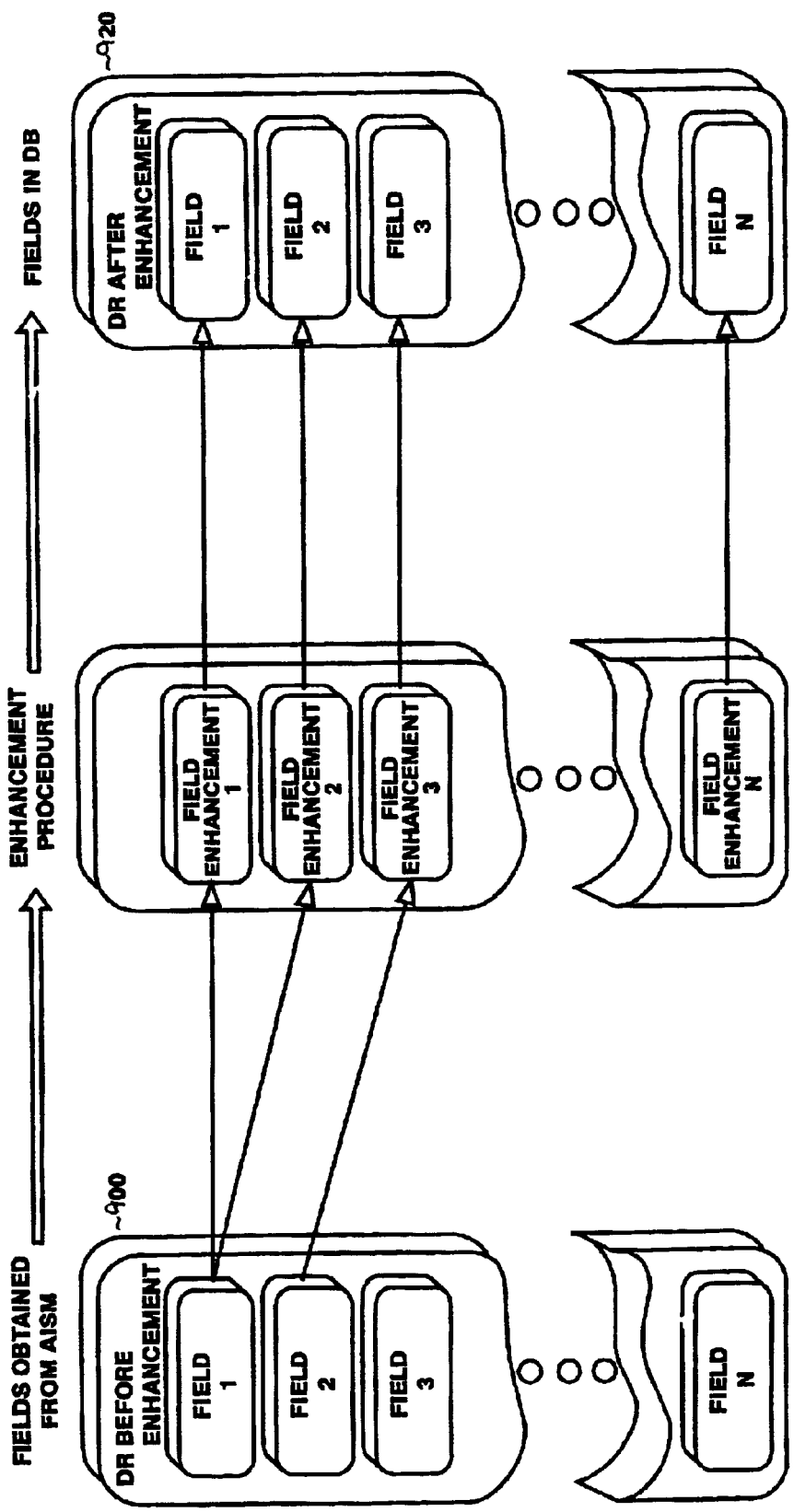

FIG. 9 illustrates an example of data enhancement. Data enhancement comprises a number of field enhancements. A field enhancement specifies how the data obtained from the trigger of the enhancement procedure is processed before it is placed in a single field in the central database 775. The data can be placed in the field directly, or new information may be added to the record by applying a Synchronous ISM function. (In the example below, the function resolves the IP address to a host FQDN"). Field enhancements may involve one or multiple steps. There is no limit to the number of steps in a Field Enhancement. The data record starts with fields obtained from an asynchronous ISM 900. The fields in the DR 900 are then enhanced using the field enhancements. The enhanced fields result in the DR 920.

A visual representation of an enhancement can be presented to the NSP. The enhancement may include an itinerary of ISMs starting off with an AISM, passing through PISMs, and terminating in the CEM 770. Using this view of the system 700, the NSP need not be shown the actual flow of data since the flow may be optimized later in order to achieve better performance. This is more of a graphical logical view of how the enhancement is achieved in steps. (PISMs can terminate more than one flow and initiate more than one flow.)

A visual representation of a field enhancement shows the per-field flow of data correlation. This process ends in the CEM 770 or in a PISM. The NSP supplies information telling the system 700 how to reach each of the terminating fields (in the CEM 770 or the PISM) starting off from the initiating fields (PISM or AISM). Each step of enhancement defines cross correlation with some SISM function.

Figure 10A:
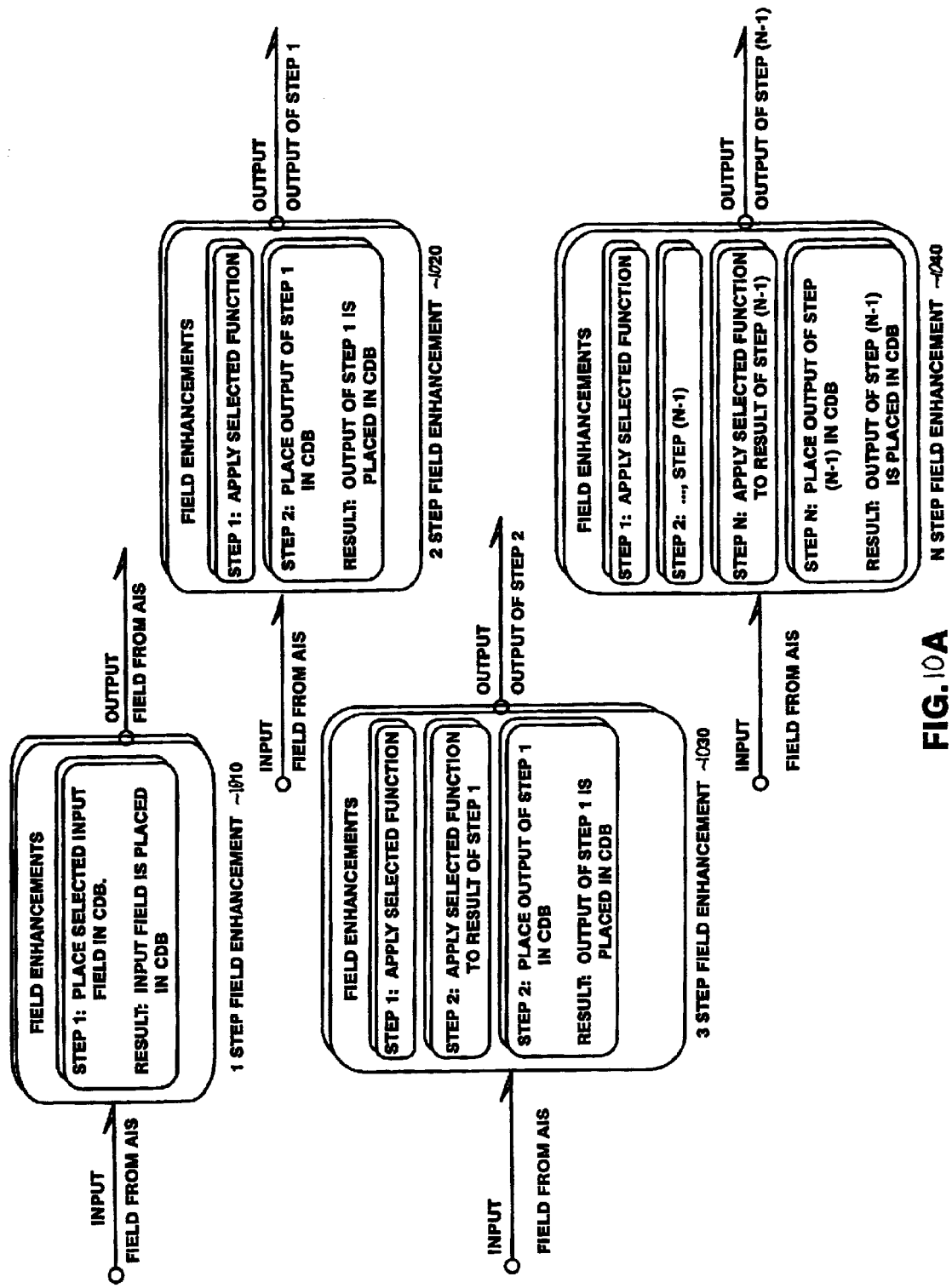

FIG. 10A illustrates various field enhancements (1010 through 1040). A field enhancement includes applying zero or more functions to a field before storing the field in a specified field in the central database 775.

One-step Field Enhancement 1010. The initial source data from the asynchronous ISM is placed directly in a field in the central database 775. Example: the field enhancement for the Source IP field.

Two-step Field Enhancement 1020. The initial source data from the asynchronous ISM is used to obtain new additional data from a synchronous network device and the new data is placed in a field in the central database 775. Example: the field enhancement for the Source Host field.

Three-step Enhancement 1030. The initial source data from the asynchronous ISM is used to obtain additional data from a synchronous ISM. The result is used to obtain more data from another ISM and the result is placed in a field in the central database 775.

The following illustrates an example data enhancement. Suppose the data obtained from a proxy server 701 contains the source IP address of a given session, such as 199.203.132.2, but not the complete domain address of the host computer (its Fully Qualified Domain Name), such as www.xacct.com. The name of the host can be obtained by another network device—the Domain Name System (DNS 702) server. The DNS server 702 contains information that matches IP addresses of host computers to their Fully Qualified Domain Names (FQDNs). Through an enhancement procedure the information collected from the proxy server 701 can be supplemented by the information from the DNS 702. Therefore, the name of the host is added to the data (the data record) collected from the proxy server 701. The process of adding new data to the data record from different network devices can be repeated several times until all required data is collected and the data record is placed in the central database 775.

Figure 10B:
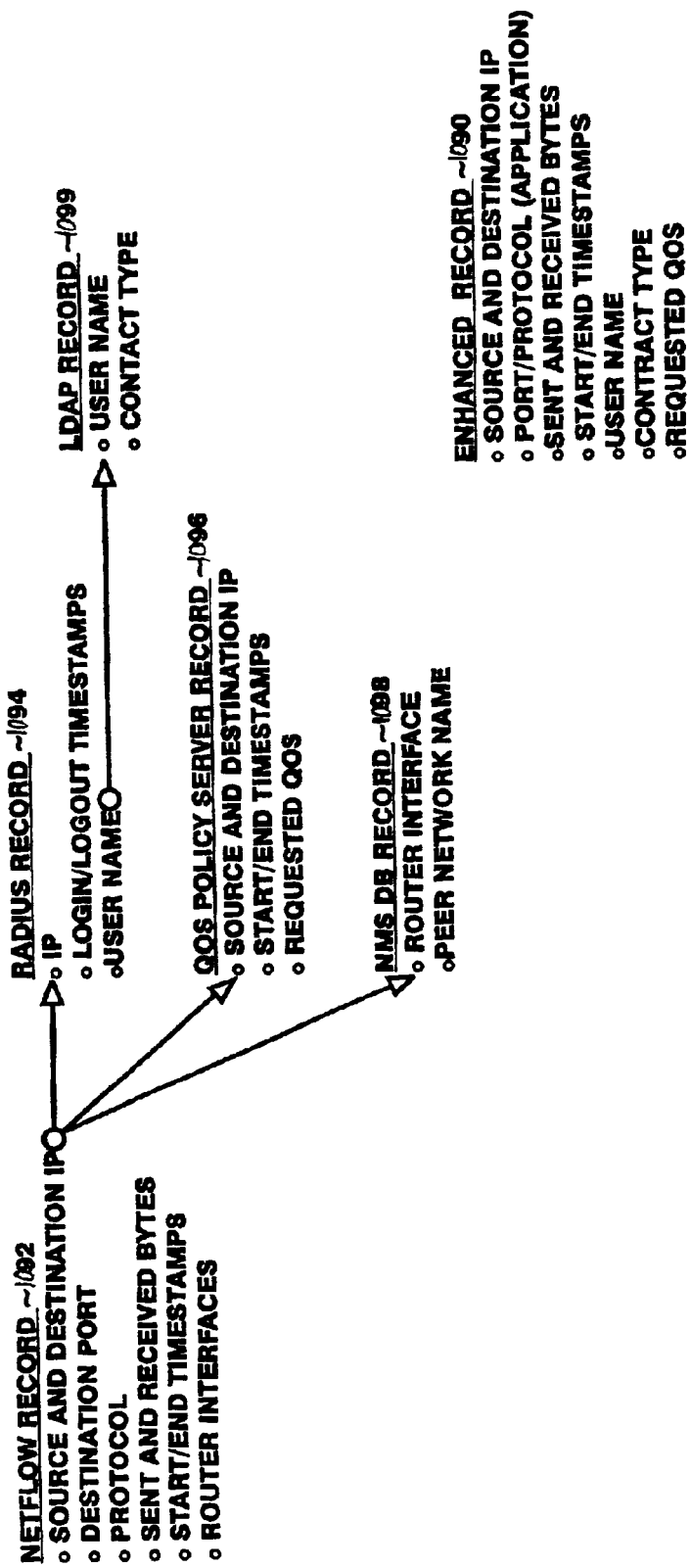

FIG. 10B illustrates another example data enhancement where an enhanced record 1090 is created from an initial netflow record 1092. Fields in the enhanced record 1090 are enhanced from the radius record 1094, the QoS policy server record 1096, the NMS DI3 record 1098, and the LDAP record 1099.

Defining Enhancement Procedures

The following describes the process for defining enhancement procedures in some embodiments of the system. Typically defining an enhancement procedure for the system 700 includes (1) defining enhancement procedures for each asynchronous ISM and (2) configuring field enhancements for all fields in the central database 775 for which the NSP wants to collect data originating from an asynchronous ISM that triggers the corresponding enhancement procedure.

An enhancement procedure can be defined as follows.

1. Access the CEM 770 using the UIS 780.

2. Select the enhancement procedures list using the UIS 780.

3. Define the name of the new enhancement procedure.
4. Select a trigger for the new enhancement procedure. The trigger can correspond to any asynchronous ISM in the system 700. Alternatively, the trigger can correspond to any asynchronous ISM in the system 700 that has not already been assigned to an enhancement procedure.
5. Optionally, a description for the enhancement procedure can be provided.
6. The new enhancement procedure can then be automatically populated with the existing fields in the central database 775. Optionally, the NSP can define the fields (which could then be propagated to the central database 775). Alternatively, based upon the type of asynchronous ISM, a preset set of fields could be proposed to the NSP for editing. What is important is that the NSP can define field procedures to enhance the data being put into the data records of the central database 775.
7. The NSP can then define the field enhancements for every field in the new enhancement procedure for which the NSP wants to collect data from the ISM that is the trigger of the new enhancement procedure.

Defining Field Enhancements

Defining a field enhancement involves specifying the set of rules used to fill a database field from the information obtained from the trigger of the enhancement procedure. The NSP defines field enhancements for each field in which NSP wants to collect data from the trigger. If no field enhancements are defined, no data from the trigger will be collected in the fields. For example, suppose the firewall asynchronous ISM 730 that triggers an enhancement procedure. Suppose the central database 775 has the following fields: source IP, source host, destination IP, destination host, user name, total bytes, service, date/time, and URL If the NSP wants to collect session data for each field except the URL from the firewall ISM 730, which triggers the enhancement procedure, the NSP defines a field enhancement for each field with the exception of the URL.

In some embodiments, the field enhancements are part of the enhancement procedure and the NSP can only define and modify them when the enhancement procedure is not enabled.

The field enhancements can be defined in a field enhancement configuration dialog box. The field enhancement configuration dialog box can have two panes. The first displays the name of the enhancement procedure, the name of its trigger, and the name and data type of the field for which the NSP is defining the field enhancement. The second is dynamic and interactive. Its content changes depending on the NSP's input. When first displayed, it has two toggle buttons, End and Continue, and a list next to them. The content of the list depends on the button depressed.

When End is depressed, the list contains all output fields whose data type matches the data type of the field for which the NSP is defining the field enhancement. For example, if the field's data type is IP Address, the list contains all fields that are of the same type, such as source IP and destination IP that the AISM supplies. The fields in the list can come from two sources: (1) the source data which the gatherer receives from the trigger and (2) the result obtained by applying a synchronous ISM function as a preceding step in the field enhancement. The following notation is used for the fields:

OutputFieldName for the output of a field origination from the trigger

SISName. FunctionName (InputArgument). OutputField for the output of a field that is the result of applying a function SISName . . . OutputField for the output of a field that is the result of applying a function as the final step of a field enhancement. The following examples are presented.

Source IP is the field provided by the trigger of the enhancement procedure that contains the IP address of the source host.

DNS . . . Host Name and DNS.Name(Source IP).Host name are the names of a field originating from the resolved function Name of a network device called DNS that resolves the IP address to a domain address. The input argument of the function is the field provided by the trigger of the enhancement procedure, called source IP. It contains the IP address of the source host. The function returns the output field called Host Name that contains the domain address of the source host. The notation DNS . . . Host Name is used when the field is the result of applying the function as the final step of a field enhancement. The notation is DNS.Name (Source IP).Host Name is used when the field is used as the input to another function.

In the user interface, if End is unavailable, none of the output fields matches the data type of the field.

When Continue is depressed, the list contains all applicable functions of the available synchronous network device configured in the system 700. If the preceding output does not match the input to a function, it cannot be applied and does not appear on the list.

The following notation is used for the functions.

SISName.FunctionName
(InputFieldName:InputFieldDataType)
(OutputFieldName.-OutputFieldDataType)

When the function has multiple input and/or output arguments, the notation reflects this. The arguments are separated by commas.

The following example shows a field enhancement.

DNS. Address(Host Name:String)->(IP Address:IP Address)

Where DNS is the name of the synchronous ISM (or network device) as it appears in the system configuration.

Address is the name of the function.

(Host Name:String) is the input to the function-host FQDN of data typeString (IP Address:IP Address) is the output—IP address of data type IPAddress The NSP can define the field enhancement by choosing items from the list. The list contains the option <none> when the End button is depressed. Choosing this option has the same effect as not defining a field enhancement: no data from the trigger will be stored in the field in the central database 775.

Additional Embodiments

The following describes additional embodiments of the invention.

In some embodiments, the user interface used by an NSP to configure the system 700 can be presented as a graphical representation of the data enhancement process. Every step in the enhancement can be shown as a block joined to another block (or icon or some graphical representation). The properties of a block define the operations within the block. In some embodiments, the entire data enhancement process from network devices to the central database 775 can be shown by linked graphics where the properties of a graphic are the properties of the enhancement at that stage.

In some embodiments, multiple CEMs 770 and/or central databases 775 can be used as data sources (back ends) for datamart or other databases or applications (e.g., customer care and billing systems).

In some embodiments, the types of databases used are not necessarily relational. Object databases or other databases can be used.

In some embodiments, other platforms are used. Although the above description of the system 700 has been IP network focused with Unix or Windows NT systems supporting the elements, other networks (non-IP networks) and computer platforms can be used. What is important is that some sort of processing and storing capability is available at the gatherers, the CEMs, the databases, and the user interface servers.

In some embodiments, the gatherers and other elements of the system 700, can be remotely configured, while in other embodiments, some of the elements need to be configured directly. For example, a gatherer may not be remotely configurable, in which case, the NSP must interface directly with the computer running the gatherer.

In other embodiments, the general ideas described herein can be applied to other distributed data enhancement problems. For example, some embodiments of the invention could be used to perform data source extraction and data preparation for data warehousing applications. The gatherers would interface with ISMs that are designed to extract data from databases (or other data sources). The gatherers would perform filtering and aggregation depending upon the needs of the data mart (in such an embodiment, the central database and CEM could be replaced with/used with a data mart). The data enhancement.

While various embodiments have been described above, it should be understood that they have been presented by way of examples only, and not limitations. Thus, the breadth and scope of a preferred embodiment should not be limited by any of the above-described exemplary embodiments, but should be defined only in accordance with the following claims and their equivalents.

What is claimed is:

1. A method for reducing latency while handling network accounting records using an aggregator, comprising:
    (a) receiving records indicative of network events, wherein the records are received in an aggregator for the purpose of aggregating the records; and
    (b) generating a command in response to the receipt of the records by the aggregator;
    (c) wherein services are rendered in response to the command with minimal latency caused by the aggregator by initiating the rendering of the services before the aggregator begins processing a new aggregation.

2. The method as recited in claim 1, wherein the command includes a start command that is generated immediately before the aggregator generates a memory state in response to the receipt of records, so that the rendering of the services is initiated prior to the generation of the memory state.

3. The method as recited in claim 1, wherein the command includes a start command that is generated immediately before other operations are performed by the aggregator in response to the receipt of the records.

4. The method as recited in claim 1, wherein the command includes a start command that is sent immediately to a receiving device or module in a data collection system of which the aggregator is a component.

5. The method as recited in claim 4, wherein the start command is sent over a network utilizing at least one of UDP/IP, TCP/IP, and IPX protocol.

6. The method as recited in claim 1, wherein the records are received over a network utilizing at least one of UDP/IP, TCP/IP, and IPX protocol.

7. The method as recited in claim 6, wherein the records are received from information sources.

8. The method as recited in claim 1, and further comprising determining whether any of the records is a signal, wherein the aggregation is evaluated in immediate response to the receipt of the signal to further minimize latency.

9. The method as recited in claim 1, wherein the services include operational support system (OSS) services, and business support system (BSS) services.

10. The method as recited in claim 1, wherein the services include providing a user with a balance in real-time, updating a pre-paid debit account in real-time, detecting a denial-of-service attack in real-time, and detecting a network intrusion in real-time.

11. The method as recited in claim 1, wherein the services are selected from the group consisting of operational support system (OSS) services, and business support system (BSS) services.

12. The method as recited in claim 1, wherein the services are selected from the group consisting of providing a user with a balance in real-time, updating a pre-paid debit account in real-time, detecting a denial-of-service attack in real-time, and detecting a network intrusion in real-time.

13. A computer program product embodied on a computer readable medium for reducing latency while handling network accounting records using an aggregator, comprising:
    (a) computer code for receiving records indicative of network events, wherein the records are received in an aggregator for the purpose of aggregating the records; and
    (b) computer code for generating a command in response to the receipt of the records before work is done by the aggregator;
    (c) wherein services are rendered in response to the command with minimal latency caused by the aggregator by initiating the rendering of the services before the aggregator begins processing a new aggregation.

14. A system embodied on a computer readable medium for reducing latency while handling network accounting records using an aggregator, comprising:
    (a) logic for receiving records indicative of network events, wherein the records are received in an aggregator for the purpose of aggregating the records; and
    (b) logic for generating a command in response to the receipt of the records before work is done by the aggregator;
    (c) wherein services are rendered in response to the command with minimal latency caused by the aggregator by initiating the rendering of the services before the aggregator begins processing a new aggregation.

15. A method for reducing latency while handling network accounting records using tin aggregator, comprising:
    (a) receiving records indicative of network events, wherein the records are received in an aggregator for the purpose of aggregating the records; and
    (b) sending a command to a receiving device or module in a data collection system of which the aggregator is a component in response to the receipt of the records by the aggregator;
    (c) wherein services are rendered in response to the command with minimal latency caused by the aggregator by initiating the rendering of the services before the aggregator begins processing a new aggregation.

16. A method for reducing latency while handling network accounting records using an aggregator, comprising:
    (a) receiving records indicative of network events, wherein the records are received in an aggregator for the purpose of aggregating the records; and (b) evaluating the records in immediate response to the receipt of the records to determine whether an update or stop command is necessary; and (c) wherein minimal latency is caused by the aggregator by initiating the evaluating before the aggregator begins processing a new aggregation.

17. The method as recited in claim 16, and further comprising generating the update or stop command immediately in response to the receipt of the records if the update or stop command is necessary.

18. The method as recited in claim 16, wherein the command is sent immediately to a receiving device or module in a data collection system of which the aggregator is a component.

19. The method as recited in claim 18, wherein the command is sent over a network utilizing at least one of UDP/IP, TCP/IP, and IPX protocol.

20. The method as recited in claim 16, and further comprising determining whether any of the records is a signal, wherein the aggregation is evaluated in immediate response to the receipt of the signal.

21. The method as recited in claim 16, wherein the evaluation of the records includes determining whether a threshold is met.

22. The method as recited in claim 21, wherein the threshold is user-configured.

23. The method as recited in claim 22, wherein the aggregation is updated by marking one of the records that was last sent if an update threshold is met.

24. The method as recited in claim 22, wherein the aggregation is stopped by resetting a memory state associated with the records if a stop threshold is met.

25. The method as recited in claim 22, wherein the aggregation is evaluated periodically in addition to being updated in immediate response to the receipt of the signal.

26. A computer program product embodied on a computer readable medium for reducing latency while handling network accounting records using an aggregator, comprising:

(a) computer code for receiving records indicative of network events, wherein the records are received in an aggregator for the purpose of aggregating the records; and (b) computer code for evaluating the records in immediate response to the receipt of the records to determine whether an update or stop command is necessary;

(c) wherein minimal latency is caused by the aggregator by initiating the evaluating before the aggregator begins processing a new aggregation.

27. A system embodied on a computer readable medium for reducing latency while handling network accounting records using an aggregator, comprising:

(a) logic for receiving records indicative of network events, wherein the records are received in an aggregator for the purpose of aggregating the records; and (b) logic for evaluating the records in immediate response to the receipt of the records to determine whether an update or stop command is necessary;

(c) wherein minimal latency is caused by the aggregator by initiating the evaluating before the aggregator begins processing a new aggregation.

28. A method for reducing latency while handling network accounting records using an aggregator, comprising:

(a) receiving records indicative of network events, wherein the records are received in an aggregator for the purpose of aggregating the records; and (b) generating an update or slop command immediately in response to the receipt of the records if the update or stop command is necessary;

(c) wherein minimal latency is caused by the aggregator by generating the update or stop command before the aggregator begins processing a new aggregation.

29. A method for reducing latency while handling network accounting records using an aggregator, comprising:

(a) receiving records indicative of network events, wherein the records are received in an aggregator for the purpose of aggregating the records; and (b) sending an update or stop command to a receiving device or module in a data collection system of which the aggregator is a component in immediate response to the receipt of the records by the aggregator;

(c) wherein minimal latency is caused by the aggregator by sending the update or stop command before the aggregator begins processing a new aggregation.

30. A method for reducing latency while handling network accounting records using an aggregator, comprising:

(a) receiving records indicative of network events, wherein the records are received in an aggregator for the purpose of aggregating the records; and (b) generating a command in response to the receipt of the records by the aggregator;

(c) wherein services are rendered in response to the command within a predetermined amount of time by initiating the rendering of the services before the aggregator begins processing a new aggregation.

* * * * *

UNITED STATES PATENT AND TRADEMARK OFFICE
CERTIFICATE OF CORRECTION

PATENT NO.        : 6,950,845 B2                                    Page 1 of 1
APPLICATION NO.   : 10/040298
DATED             : September 27, 2005
INVENTOR(S)       : Givoly It is certified that error appears in the above-identified patent and that said Letters Patent is hereby corrected as shown below:

Col. 18, line 50, please replace "tin" with --an--;

Col. 20, line 18, please replace "slop" with --stop--.

Signed and Sealed this

Twenty-fourth Day of May, 2011

David J. Kappos
*Director of the United States Patent and Trademark Office*